United States Patent [19]

Shannon

[11] Patent Number: 4,615,112
[45] Date of Patent: Oct. 7, 1986

[54] APPARATUS AND METHOD FOR PRESENTING FASTENERS

[76] Inventor: John K. Shannon, 200 S. Vincennes Cir., Racine, Wis. 53402

[21] Appl. No.: 732,073

[22] Filed: May 9, 1985

[51] Int. Cl.$^4$ .............................................. B23D 19/00
[52] U.S. Cl. ........................................ 29/822; 209/929
[58] Field of Search .................. 209/929; 414/417; 29/822

[56] References Cited

U.S. PATENT DOCUMENTS

| | | | |
|---|---|---|---|
| 3,487,965 | 1/1970 | Gale | 414/417 |
| 3,722,719 | 3/1973 | Frank | 414/417 |
| 3,780,892 | 12/1973 | Frank | 414/417 |
| 4,247,241 | 1/1981 | Warren | 414/417 |

Primary Examiner—Howard N. Goldberg
Assistant Examiner—Steven Nichols
Attorney, Agent, or Firm—Peter N. Jansson, Ltd.

[57] ABSTRACT

A method and apparatus for presenting fasteners seriatim at a predetermined position in a predetermined orientation for subsequent transfer or fastening. The invention includes a container for jumbled similar fasteners, reciprocating or other lifting means having an arm extending to a distal end within the container, and passive pickup means on the distal end configured to receive a fastener from among the jumbled fasteners and hold it by cradling as the pickup element moves upwardly through the jumbled fasteners to a position thereabove. The method and apparatus can repetitively present one type of fastener to one position, an array of one type of fastener to several positions, or an array of plural types of fasteners to plural positions.

20 Claims, 15 Drawing Figures

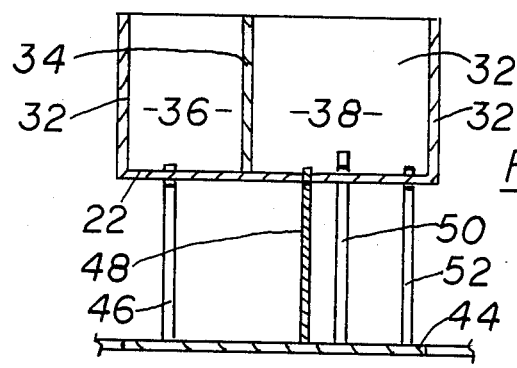
FIG. 3
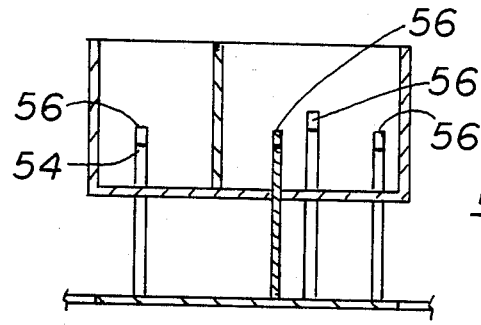
FIG. 4
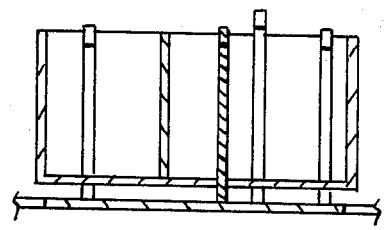
FIG. 5
FIG. 6
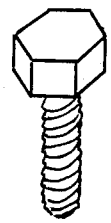
FIG. 8
FIG. 10
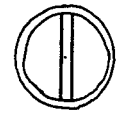
FIG. 12
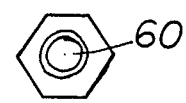
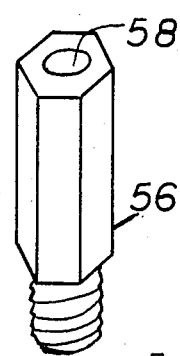
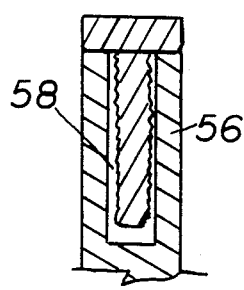
FIG. 7
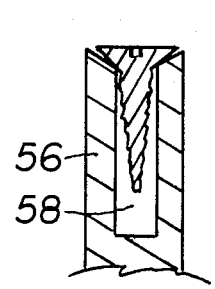
FIG. 9
FIG. 11

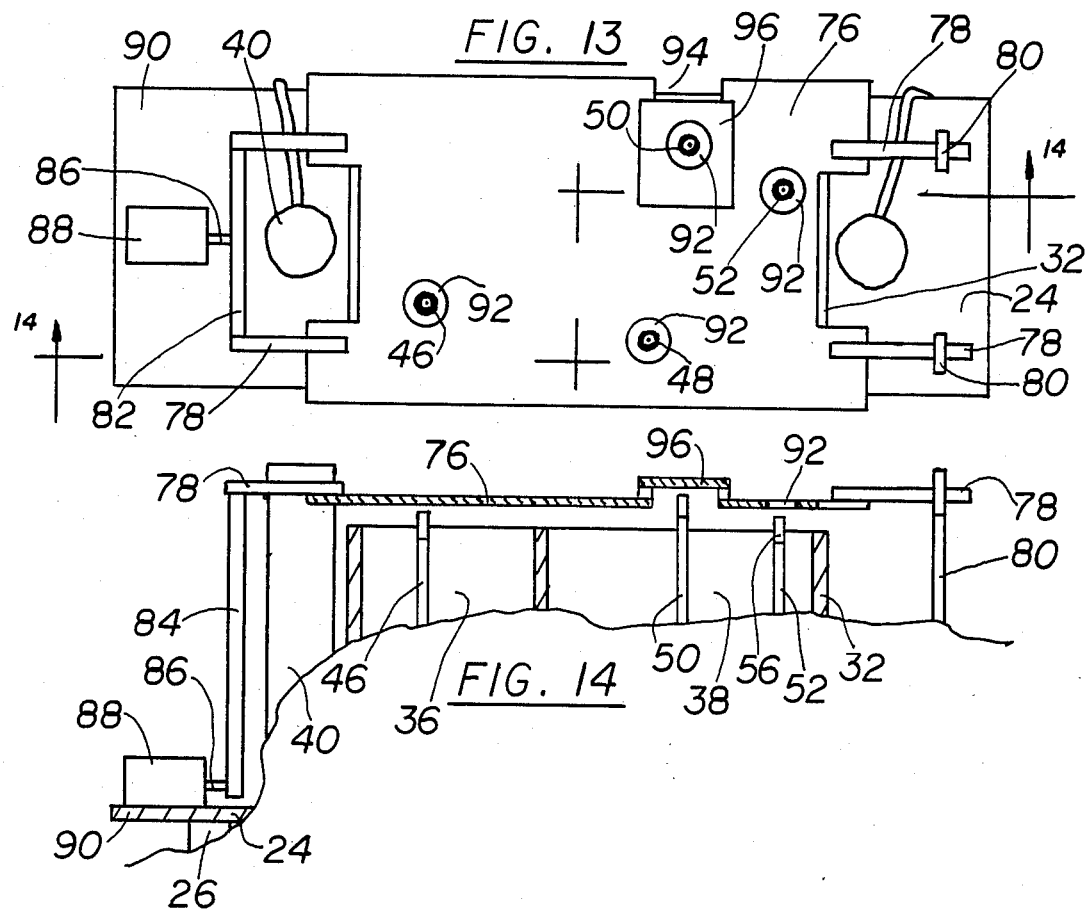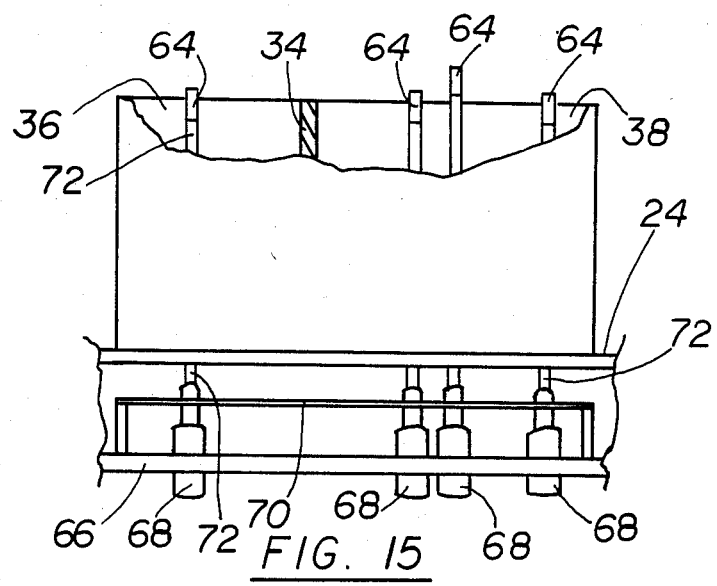

APPARATUS AND METHOD FOR PRESENTING FASTENERS

FIELD OF THE INVENTION

This invention is related generally to automatic assembly by the repetitive application of fasteners such as nuts, screws and bolts and, more particularly, to methods and apparatus for presenting fasteners at predetermined positions in predetermined orientations in preparation for fastening.

BACKGROUND OF THE INVENTION

Fastening is, of course, an essential part of assembly. The placement and application of fasteners of various kinds, such as nuts, screws and bolts, is often a major time-consuming part of assembly operations. Such work is exacting and repetitive.

One aspect of a fastening operation which is often complicated to handle automatically is the seemingly simple step of taking fasteners seriatim from a collection of jumbled similar fasteners and presenting them seriatim at the point of fastener application in the proper orientation for fastening.

Because of the exacting nature of fastening operations, such as the fastener presenting and orienting step just noted, fastening operations are frequently accomplished by hand labor. Human beings can easily take a fastener from a jumbled collection of similar fasteners, move and manipulate it into the proper position and orientation for application, and then apply it in the required manner.

However, the use of human labor for such operations is sometimes considered too costly. Furthermore, the repetitive and tiring nature of the work can lead to quality control problems and/or slow-downs. Fastening often becomes the bottleneck on a production line.

The use of automatic fastening equipment, such as robot devices of various kinds, is well known in fastening operations. However, because of the exacting nature of the work and the great variety of fastening operations, such equipment is often complex and expensive.

Vibratory feeders are sometimes used in the repetitive presentation and orientation of fasteners. Such feeders dispense fasteners onto and along a track or through a tube to a driver or other fastener-applying tool. Such apparatus often includes a variety of complicated devices, such as escapements to help assure that fasteners are presented one at a time and do not spew out in uncontrolled fashion. Vibratory feeders often are complex, expensive and unreliable devices.

In any given assembly operation, a particular vibratory feeder is set up specifically to repetitively dispense a fastener of a predetermined type to a single application point. If a number of fasteners must be applied to a product under assembly, whether such fasteners are similar or dissimilar to one another, it is typically necessary to employ separate dedicated feeders for each fastener.

In summary, there is a need for inexpensive and reliable automatic apparatus for presentation of fasteners in assembly operations.

BRIEF SUMMARY OF THE INVENTION

This invention is an improved apparatus and method for presenting fasteners seriatim at a predetermined position in a predetermined orientation. In certain embodiments, this invention is an improved apparatus and method for simultaneously and repetitively presenting an array of similar or dissimilar fasteners at predetermined positions each in a predetermined orientation.

The apparatus and method of this invention take fasteners one by one (or set by set, when an array of fasteners is to be presented) from a collection (or collections) of jumbled fasteners and present them at the desired place(s) in the proper orientation(s). A collection of "jumbled fasteners" is a large number of similar fasteners poured together in randomly-oriented fashion—as typically purchased in bulk.

The apparatus of this invention includes a container for jumbled similar fasteners, lifting means (such as reciprocating means) which has an arm extending to a distal end within the container, and a pickup element on the distal end which is movable up and down and is configured to receive a fastener from among the jumbled fasteners and hold, or cradle, it in a predetermined axial orientation during the upward movement of the arm and pickup member through the jumbled fasteners to a predetermined position above such fasteners.

The lifting means preferably moves the distal end of the arm and the pickup means thereon through a reciprocating vertical stroke spanning substantially from the inside bottom of the container to a position above the container. A long vertical stroke is generally desirable, at least to a point. Therefore, having a container of substantial vertical dimension is generally desirable.

The longer the vertical upward stroke of the arm and pickup element through jumbled fasteners, the greater the number of fasteners which the pickup element will impact during such stroke. A greater number of impacts of the pickup element with fasteners in the jumbled collection means a greater likelihood that a fastener will be received by the pickup element in the predetermined axial orientation or close to the predetermined axial orientation and be carried thereby to be presented in the predetermined proper orientation at the proper location above the container. In some cases, a fastener contacted by the pickup element in nearly the predetermined axial orientation will be coaxed into the proper orientation by movement of the pickup element thereagainst and therefore received and held by it.

The efficiency of the pickup operation depends not only on the length of the upward stroke, but also on the configuration of the pickup element vis-a-vis the fastener to be received and held thereby. Such configuration will be designed such that the fastener is cradled in the pickup element, not too loosely or too tightly. Only one fastener should be received and held thereby at one time, and once a fastener has been received thereby, other fasteners which the pickup element and such fastener contact during the remainder of the upward stroke will be pushed aside back into the jumbled collection of similar fasteners.

The pickup element will typically include a socket corresponding to the configuration of the fastener to be received thereby. If the fastener is a nut, an upwardly-facing central post may be included to help receive and hold the nut. The outward peripheral configuration of the pickup element is preferably substantially congruent to the peripheral configuration of the fastener, such as the hexagonal or other shape of a nut. This tends to rotationally orient a fastener, which has already been received by the pickup member, by the additional contacts occurring between the jumbled fasteners and the held fastener as upward movement of the pickup member continues. Of course, when a fastener is received by the pickup member, it is in the required predetermined axial orientation.

In certain highly preferred embodiments of this invention, there are a multiplicity of reciprocating arms, each with a pickup element on its distal end, connected to a carrier which is part of the reciprocating means. Such arms and pickup elements may be in spaced relation within a single container for jumbled similar fasteners, such that an array of similar fasteners may be simultaneously presented at predetermined locations and each in a predetermined orientation. Or, such multiplicity of arms and pickup elements may be in a multiplicity of separate containers each having its own type of fasteners, such that an array of various types of fasteners may be simultaneously presented at predetermined positions and in predetermined orientations. In the latter case, each pickup element is, of course, configured to receive the type of fastener in its respective container.

When a multiplicity of pickup elements are used, the pickup elements may be arranged in generally coplanar fashion, such that the fastener array presented is two-dimensional. This typically would be the case when a number of fasteners must be applied, for example, to a flat piece. However, the pickup elements can be arranged at two or more different levels, in noncoplanar fashion, such that the array of fasteners is three-dimensional.

In other words, the containers for jumbled fasteners, the arms, the arm lengths, and the pickup elements may be chosen, positioned and arranged such that the array of fasteners simultaneously presented by the apparatus of this invention will meet the requirements of the workpiece being fastened.

In most cases, the axial orientations of all fasteners in an array presented by the apparatus of this invention will be the same, that is, the axes will be parallel and vertical. However, tilted and non-parallel axial orientations are possible. If this is desired, it can be accomplished in various ways, such as by designing the pickup element to receive and hold a fastener in a tilted orientation.

In certain highly preferred embodiments, the lifting means includes a reciprocating drive means and a carrier connected thereto in position below the container or containers for jumbled fasteners. The drive means may be a reversing pneumatic or hydraulic drive, or other known drive means. The arm or arms are attached to the carrier and, when there are a multiplicity of arms, they move up and down simultaneously as the carrier moves up and down.

The container or containers preferably have a floor positioned above the carrier, with one or more openings each of which receives one of the arms which extends from the carrier to its distal end within the container. The container or containers also preferably have open tops through which fasteners are removed from the collection(s) of jumbled fasteners and through which the supply of jumbled fasteners may be replenished as needed.

The arm or arms are preferably vertically-oriented rods of length equaling or exceeding the length of their stroke. Such rods are attached to the carrier and extend to their distal ends within a container. The pickup element at the distal end of each rod within a container is upwardly-facing and is driven up and down by the reciprocating means through a vertical stroke as previously described.

The pickup elements are preferably removable from the distal ends of the rods or other arms. This allows easy adjustment of the apparatus of this invention to allow the pickup of a variety of fastener types, shapes and sizes. One easy means for attachment and removal or pickup elements from the distal ends is a simple threaded attachment, but a variety of other attachment means can be used.

Certain preferred embodiments of the apparatus of this invention include a tool carriage which has a fixed arrangement of fastener-applying tools on it which matches the fastener array. The fasteners of such fastener array are loaded from their respective pickup elements onto their corresponding fastener-applying tools, and the fasteners are moved to their application points on the workpiece by movement of the carriage. Such transferring of fasteners from pickup elements to fastener-applying tools may be accomplished by the use of magnetic receptacles on the tools, as are well known.

The arrangements of the pickup elements and the fastener-applying tools are determined by and match the pattern of fastener application points. During the movement of the fastener array from the pickup elements to the application points, the predetermined array of fasteners is maintained so that the fasteners can be simultaneously applied at their application points.

In some embodiments of this invention the pickup elements have an additional function—serving as part of the fastener-applying tools. In such cases, each arm has a fastener-applying tool attached to it, with the pickup element at the distal end of the arm serving as the working end of the tool, applying the fastener directly to the intended application point on the workpiece being assembled. This sort of arrangement may typically be used when the fasteners are to be applied in an upward direction.

In certain other preferred embodiments, knock-off members are located adjacent to and just above the predetermined positions at which fasteners are presented. Attached to a knock-off member is a device to momentarily move the knock-off member laterally to a position directly above the predetermined position, that is, just above the pickup element when it is at the predetermined position.

Such knock-off members and their actuators serve to eliminate any extra, unwanted fastener which may be resting atop the properly loaded pickup element by knocking it back into the collection of jumbled fasteners in the container below. This feature increases the reliability of the apparatus in proper presentation of fasteners.

The method of this invention presents fasteners seriatim at a predetermined position in predetermined orientations. The method includes the steps of: (1) passing the end of a rod of the type described, with a pickup element of the type described, in an upward endwise direction through a jumbled collection of similar fasteners such that the pickup element receives one of the fasteners during its upward movement and cradles it in the predetermined orientation as the movement continues; (2) removing the fastener from the pickup element when it is at or near its position above the jumbled collection; (3) withdrawing the rod and pickup element downwardly through the jumbled collection: and (4) repeating these steps again and again.

Certain preferred examples of the method of this invention involve the use of a multiplicity of rods for the purpose of simultaneous presentation of arrays of fasteners, either of similar or dissimilar types. In certain other preferred examples, the removing step is itself the direct application of the fastener to its application point by the pickup element. In some other preferred examples, the removing step is preceded by the additional step of knocking off any extra fastener which may be resting above the pickup element when it reaches the predetermined position.

The method and apparatus of this invention overcome the aforementioned problems and disadvantages of prior methods and devices. The apparatus is simple and inexpensive in construction. It eliminates the need for a number of complex dedicated devices to present a number or fasteners to a workpiece for fastening. Fastening operations can be completed quickly using this invention, and the drawbacks of manual operations are avoided.

An important advantage is the ability of the apparatus of this invention to adapt to different fastening jobs, in which fasteners of varying kinds must be applied in varying patterns. Changeover is a relatively simple operation. Such flexibility in itself contributes to the desirability of the apparatus of this invention for use in a variety of assembly operations.

OBJECTS OF THE INVENTION

It is an object of this invention to provide improved apparatus for use in fastening operations.

Another object of this invention is to provide an improved method and apparatus for presenting fasteners seriatim at a predetermined position in a predetermined orientation.

Another object of this invention is to provide an improved method and apparatus for simultaneously presenting an array of similar or dissimilar fasteners to be applied to a workpiece in such array.

Still another object of this invention is to provide an improved method and apparatus for simultaneous application of an two- or three-dimensional array of fasteners to a workpiece.

Yet another object of this invention is to provide a method and apparatus of the type described for presenting fasteners at predetermined points in predetermined axial and rotational orientations.

Another object of this invention is to provide an improved method and apparatus for the purposes described which are simpler and more economical than methods and apparatus of the prior art.

Another object of this invention is to provide a method and apparatus for presentation of fasteners which is economical yet highly reliable.

Another object of this invention is to provide an improved method and apparatus for the purposes described which may readily be adapted for varying fasteners and fastener arrays as required for a variety of assembly operations.

These and other objects will be apparent from the following additional descriptions and from the drawings, wherein:

BRIEF DESCRIPTION OF THE DRAWINGS

FIGS. 3-5 are reduced fragmentary front sectional views taken along section 3—3 as indicated in FIG. 2, each showing the apparatus at a different part of its operational cycle.

FIG. 6 is an enlarged fragmentary exploded view showing a rod distal end, a pickup element thereon, and a fastener held thereby.

FIGS. 7 and 8 are a side sectional view and a top view, respectively, of a pickup element holding a bolt, as in FIG. 6.

FIGS. 9 and 10 are a side sectional view and a top view, respectively, of a pickup element holding a tapered screw.

FIGS. 11 and 12 are a side sectional view and a top view, respectively, of a pickup element holding a hexagonal nut.

FIG. 13 is a top view of a modified version of this invention, having a knock-off member.

FIG. 14 is a fragmentary sectional view of FIG. 13, taken along section 14—14.

FIG. 15 is a fragmentary, partially cutaway front elevation of another modified embodiment of this invention, in which the pickup elements function as part of fastener-applying tools.

DETAILED DESCRIPTION OF PREFERRED EMBODIMENTS

Figure 1:
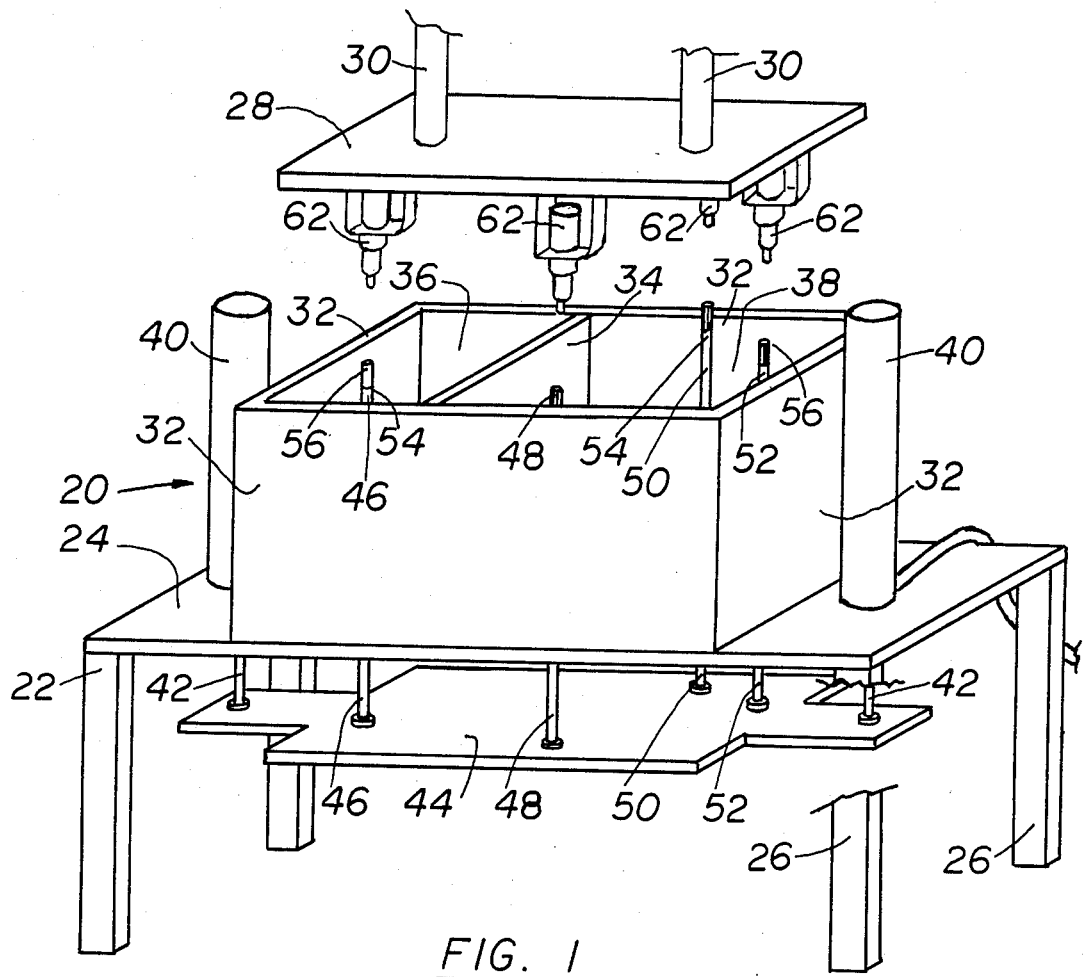
FIG. 1 is a perspective view, with a minor portion in cutaway, of an apparatus in accordance with this invention.

FIG. 1 illustrates a preferred fastener presenting apparatus 20. Major portions of presenting apparatus 20 are formed of or secured to a table 22, which includes a tabletop 24 and four legs 26. A tool carriage 28 is secured by carriage supports 30 above table 22 and the parts attached thereto. Carriage supports 30 are attached to a carriage moving means (not shown), such that tool carriage 28 is movable with respect to the table-mounted apparatus, as will hereafter be described.

Secured to tabletop 24 are front, rear, and side container walls 32, which are joined to each other at their common corners. Secured between the front and rear walls is a divider 34. Walls 32 and divider 34 form two containers 36 and 38 for holding jumbled fasteners. Tabletop 24 forms the floor of containers 36 and 38, and both containers have open tops. Each container holds one kind of fastener. For example, container 36 might hold jumbled hex-headed bolts while container 38 holds jumbled hexagonal nuts. A variety of other fastener sizes and types can be presented using the apparatus and method of this invention.

Also secured to tabletop 24, in positions adjacent to containers 36 and 38, are pneumatic reciprocating drive units 40. As illustrated in FIG. 1, each pneumatic drive unit 40 includes a push-pull shaft 42 which extends through tabletop 24 and moves up and down, in a vertical reciprocating motion. Pneumatic drive units 40 are of known type. A variety of other well-known types of reciprocating drive units can be used.

A carrier 44 is suspended, by attachment at either end thereof to the lower ends of push-pull shafts 42, in a position below tabletop 24 and below containers 36 and 38. Carrier 44 moves up and down with push-pull shafts 42 between the positions illustrated by FIGS. 3 and 5.

Mounted to carrier 44 are vertical arms or rods 46, 48, 50 and 52. Each such rod extends from carrier 44 into the container above it through an opening in container floor 24, as best shown for rod 48 in FIGS. 3-5. Rod 46 extends into container 36 and rods 48, 50 and 52 extend into container 38. Each of such rods extends to a distal end 54 within one of the containers. Carrier 44 and the rods attached thereto are reciprocating means which move up and down with respect to containers 36 and 38.

On each distal end 54 is a pickup element 56 having an upwardly facing end. As shown in FIG. 6, pickup elements 56 are attached to distal ends 54 by a threaded connection. Other convenient connection means can be used, or a pickup element can be integrally formed on the distal end of a rod.

As shown in FIGS. 6-12, pickup elements 56 are each configured to receive a fastener of a particular shape and size in a particular axial orientation. For example, the pickup elements in FIGS. 6-10 each have a shank-receiving bore 58 which will not accept the subject fastener in any orientation other than the predetermined acceptable orientation. The pickup element illustrated in FIGS. 11 and 12 includes an upwardly-facing nub 60 over which a nut of proper size will be received.

Such fasteners, once received from among the jumbled fasteners through which the pickup element moves, are held cradled in or on the pickup element as its upward movement continues to a position above the jumbled similar fasteners. In some cases, such continuing upward movement serves to orient the fastener rotationally. For example, the pickup elements shown in FIGS. 6-8, 11 and 12 have a hexagonal peripheral configuration matching the configuration of the bolt head or nut, as the case may be. As upward movement continues, the continuing contacts against other fasteners in the jumbled collection of fasteners tend to move the held fastener into a rotational orientation matching that of the pickup piece.

As shown in FIGS. 3-5, pickup elements 56 move through jumbled containers through substantially the entire vertical dimension of containers 36 and 38. As previously noted, this maximizes the likelihood that a fastener will be received by each of the pickup elements during the upward stroke.

Figure 2:
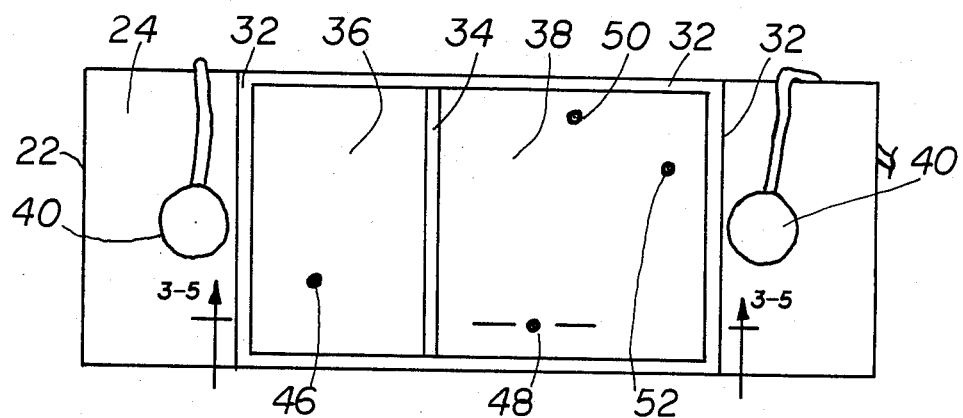
FIG. 2 is a top view of FIG. 1, but with the upper portion, that is, the tool carriage, removed.

As illustrated best in FIGS. 1 and 2, rods 46, 48, 50 and 52, which are parallel, are arranged in a particular pattern on carrier 44. As illustrated best in FIGS. 1 and 3-6, rods 46, 48, 50 and 52 are not all of the same length, rods 46, 48 and 52 being of equal length and rod 50 being longer. The arrangement and length of the rods, and the type of pickup elements to be used, are determined by the fastening task.

When the rods make their simultaneous upward pickup moves through the jumbled fasteners, each pickup element will receive and hold a fastener in the proper axial orientation. Thus, because of the arrangement and lengths of the rods, an array of fasteners will be presented in predetermined positions and predetermined orientations above the collections of jumbled fasteners. Such fasteners are thereby ready for simultaneous application to a workpiece or simultaneous transfer to fastener-applying tools of the type necessary for application of such fasteners.

Mounted to tool carriage 28 are four fastener-applying tools 62, one for each fastener in the array which is presented. The tools are positioned properly on tool carriage 28 such that movement of carriage 28 to the right location allows the transfer of the fasteners in the array onto the tools. The loading of the tools may be facilitated by the use of magnetic tool tips, as is well known in the art.

After such transfer or loading step, tool carriage 28 is moved, by means not shown, to the workpiece, without changing the predetermined array. This allows the simultaneous application of all the fasteners in the array to the workpiece.

The pickup elements can be coplanar, that is, on the same horizontal level, or on different levels. The pickup elements on rods 48 and 52 are on a common plane, as are the pickup elements on rods 46, 48 and 52. The pickup element at the end of rod 50 is on a different plane. Thus, the array of fasteners presented can be either two-dimensional or three-dimensional.

FIG. 15 illustrates another embodiment of the invention, in which fastener-applying tools are attached to the arms such that the pickup elements 64 themselves are used to apply fasteners directly to the application points. As shown in the drawing, a modified carrier 66 is used because it is specially adapted to hold fastener-applying tools 68. Carrier 66 includes a securing plate 70 which holds tools 68 firmly in the proper positions. Arms 72 are secured to carrier 66 through tools 68.

When using the embodiment of FIG. 15, it is preferred that the workpiece which requires fastening be moved to a position above the loaded pickup elements. Then, with an additional upward movement of carrier 66 and its attached tools 68, arms 72 and pickup elements 64, the fasteners can be applied to the application points on the workpiece thereabove. A number of other variations of movement are possible.

FIGS. 13 and 14 illustrate another modification of this invention. The apparatus shown is like the embodiment of FIGS. 1-12 in every respect, but a knock-off plate 76 has been added. Knock-off plate 76 extends over pickup elements 56 at a level just above the predetermined location at which fasteners are presented.

Knock-off plate 76 is supported by four horizontal bars 78 attached at the ends of plate 76. Two of the horizontal bars 78 extend freely through holes (not shown) at the top of two vertical supports 80. The other two bars 78 are joined together by yoke 82 to which a vertical link 84 is affixed. Vertical link 84 extends downwardly from yoke 82 to connect firmly with drive pin 86, which forms the moving part of a drive device 88. Drive device 88 is affixed to an extension 90 of tabletop 24.

The left and right movement of drive pin 86 (as viewed in FIGS. 13 and 14) controls the lateral position of knock-off plate 76 with respect to pickup elements 56. Drive means 88 is preferably an electromechanical device, such as a solenoid, of the type which gives, for example, a momentary leftward movement to drive pin 86 and then immediately returns it to its rightmost position, where it remains until next actuated. Such leftward movement, which is activated by a sensor (not shown) just at the time the loaded pickup elements reach their top position (at the predetermined positions), eliminates any extra fasteners which might be resting on top of the loaded pickup elements, causing them to fall back into the container below. Such knock-off action will now be described.

Knock-off plate 76 forms a fixed array of void spaces 92 which are directly above pickup elements 56. Since three of the pickup elements are at the same level, void spaces 92 for them are formed as openings in the main portion of knock-off plate 76. Mounted to plate 76, in a position above a cut-out 94 in plate 76, is a raised plate 96 in position to accommodate the higher pickup element on rod 50.

In each case, the plate and, more specifically, the edges of the openings forming a void space 92 are above the level of the predetermined position of fastener presentation and just adjacent to the position directly above the pickup elements. When drive device 88 is actuated, knock-off plate 76 and its attached raised plate 96 move to the left (as viewed in FIGS. 13 and 14).

Such action will knock any extra fastener off from above any pickup element 56 and down into the container below. Such action occurs simultaneously for the entire array of pickup elements. Immediately thereafter, the plates, and the array of void spaces formed in them, return to their original positions allowing the removal of the array of fasteners for subsequent application to a workpiece.

The apparatus of this invention can be made using well known parts and materials. Acceptable parts and materials will be known to those skilled in the art.

While reciprocating apparatus is preferred, other lifting means may be used, such as a rotating device having an arm moving up in the container and down outside the container.

A variety of tool carriages and fastener-applying tools can be used. As noted, in some cases the rods and pickup elements could themselves function as fastener-driving tools. A variety of drive devices can be used for knock-off operations.

While in the foregoing specification the apparatus and method of this invention have been described in relation to certain preferred embodiments, and many details have been set forth for purposes of illustration, it will be apparent to those skilled in the art that the invention is susceptible to additional embodiments and that certain of the details described herein can be varied considerably without departing from the spirit of the invention.

What is claimed is:

1. Apparatus for presenting fasteners seriatim at a predetermined position in a predetermined orientation comprising:
   a container for jumbled similar fasteners;
   lifting means having an arm extending to a distal end within the container and repeatedly movable in an upward direction relative to the container; and
   a pickup element on the distal end which is configured to receive a fastener from among the jumbled fasteners and hold it in said predetermined orientation as the pickup element moves upwardly through the jumbled fasteners within the container to said predetermined position thereabove.

2. The apparatus of claim 1 comprising: the lifting means having a reciprocating carrier and a multiplicity of said arm connected thereto with their distal ends within the container and a multiplicity of said pickup elements, each on one of said distal ends, whereby an array of similar fasteners may be simultaneously presented at predetermined positions each in the predetermined orientation.

3. The apparatus of claim 2 wherein the pickup elements are substantially coplanar, whereby the array is two-dimensional.

4. The apparatus of claim 2 wherein the pickup elements are at different levels, whereby the array is three-dimensional.

5. Apparatus of claim 1 for simultaneously presenting an array of various types of fasteners at predetermined positions each in a predetermined orientation comprising:
   a multiplicity of said containers, each for one of the various types of fasteners;
   said lifting means having a reciprocating carrier and a multiplicity of said arms connected thereto, each arm having its distal end within one of the containers; and
   a multiplicity of said pickup elements, each on one of said distal ends within one of the containers and configured to receive a fastener from among jumbled fasteners in said one container and hold it in a predetermined orientation as the pickup element moves upwardly through the jumbled fasteners within said one container to a position thereabove.

6. The apparatus of claim 5 wherein the pickup elements are substantially coplanar, whereby the array is two-dimensional.

7. The apparatus of claim 5 wherein the pickup elements are at different levels, whereby the array is three-dimensional.

8. The apparatus of claim 1 wherein:
   the lifting means comprises reciprocating drive means and a carrier connected thereto in position below the container;
   the container has an open-top and has a floor with an opening positioned above the carrier;
   the arm is a vertically-oriented rod attached to the carrier and extending through said opening to its said distal end within the container; and
   the pickup element is upwardly-facing and is driven up and down by the reciprocating means through a vertical stroke spanning substantially from said container floor to above said container.

9. The apparatus of claim 8 having: a multiplicity of said rods connected to the carrier and extending through a multiplicity of said openings into the container to their distal ends; and a multiplicity of said pickup elements, each on one of said distal ends, whereby an array of similar fasteners may be simultaneously presented at predetermined positions each in the predetermined orientation.

10. Apparatus of claim 8 for simultaneously presenting an array of various types of fasteners at predetermined positions each in a predetermined orientation comprising:
    multiplicity of said containers above the carrier, each for one of the various types of fasteners;
    a multiplicity of said rods and said pickup elements, each rod having its distal end and one of said pickup elements thereon within one of the containers, such pickup element configured to receive a fastener from among jumbled fasteners in said one container and hold it in a predetermined orientation as the pickup element moves upwardly in said vertical stroke.

11. The apparatus of claim 1 or 8 wherein the pickup element has a peripheral configuration substantially congruent to the peripheral configuration of said fastener, whereby upward movement of said pickup element and said fastener held thereby through said jumbled fasteners tends to rotationally orient said fastener around the direction of movement to align the corresponding sides of said fastener and said pickup element.

12. The apparatus of claim 9 or 10 further comprising a carriage having a fixed arrangement of fastener-applying tools thereon, said arrangement matching the fastener array, whereby said fasteners can be simultaneously loaded onto the tools, moved by the carriage, and applied by the tools to a pattern of application points matching the fastener array.

13. The apparatus of claim 1, 2 or 5 wherein each of said arms has a fastener-applying tool attached thereto, whereby after a fastener is received by the pickup element it is applied by the pickup element directly to its intended application point.

14. The apparatus of claim 1 further including a knock-off member adjacent to and just above said predetermined position, and means to momentarily move said knock-off member laterally to a position directly above the pickup element when it is at said predetermined position, whereby any extra fastener resting above the pickup element may be knocked off and back into the container.

15. Apparatus of claim 14 for simultaneously presenting an array of fasteners comprising:
the lifting means having reciprocating drive means and a carrier connected thereto in position below the container;
a multiplicity of said arms, said arms being vertical rods attached to the carrier and together holding an array of said pickup elements;
said knock-off member forming a fixed matching array of void spaces directly above said pickup elements; and
said moving means moving the fixed array of void spaces laterally such that all said extra fasteners are knocked off simultaneously.

16. A method for presenting fasteners seriatim at a predetermined position in a predetermined orientation comprising:
passing the end of a rod in an upward direction endwise through a jumbled collection of similar fasteners to the predetermined position above the collection, said rod having a pickup element on its end which is configured to receive one of said fasteners which it encounters during its upward movement through the jumbled collection and cradle it in the predetermined orientation as such movement continues;
removing the fastener from the pickup element;
withdrawing the rod and pickup element downwardly through the jumbled collection; and
repeating the above steps.

17. The method of claim 16 wherein a multiplicity of rods are simultaneously passed through the jumbled collection, whereby an array of similar fasteners are repetitively presented at predetermined positions in predetermined orientations.

18. The method of claim 16 wherein there are a multiplicity of collections of jumbled fasteners, each of its own type, and a multiplicity of rods and pickup elements are simultaneously passed through such jumbled collections, each such pickup element configured to receive and hold a fastener from among the fastener collection it contacts, whereby an array of different fasteners may be repetitively presented at predetermined positions each in a predetermined orientation.

19. The method of claim 16 wherein said removing step is the direct application of said fastener to its application point by the pickup element.

20. The method of claim 16 including the further step of, just prior to the removing step, knocking off any extra fastener which may be resting above the pickup element.

* * * * *